July 11, 1933.  K. M. URQUHART  1,918,005
BUBBLE CAP
Filed Feb. 2, 1932  2 Sheets-Sheet 1
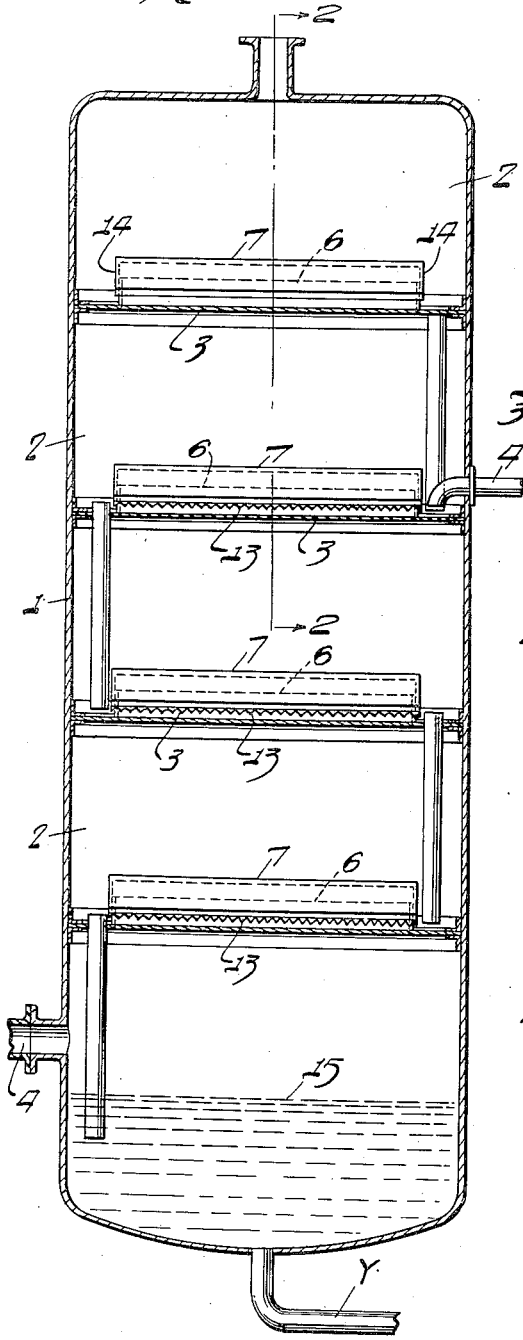
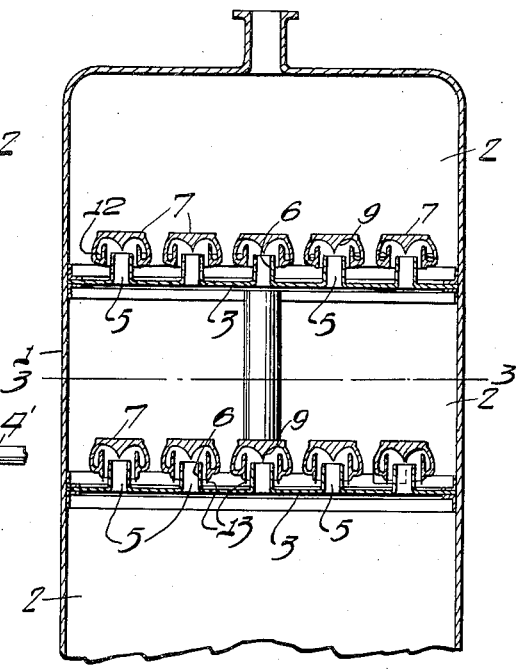
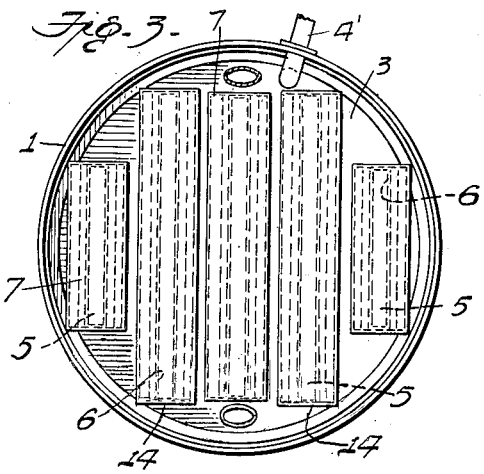
Inventor
Kenneth M. Urquhart
By Percy H. Moore
Attorney

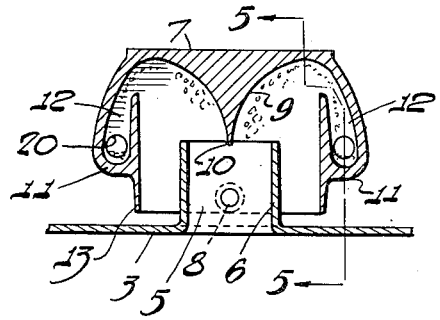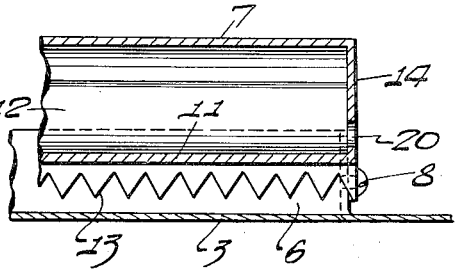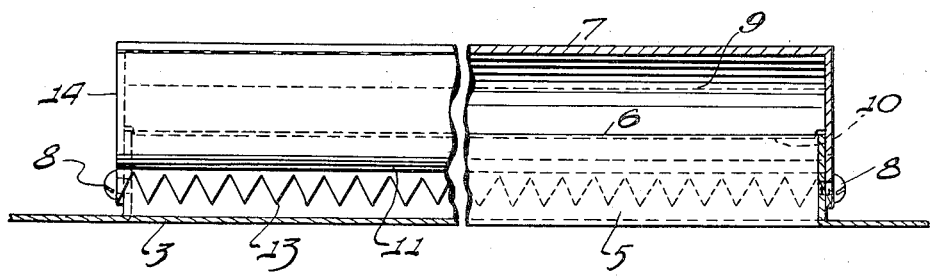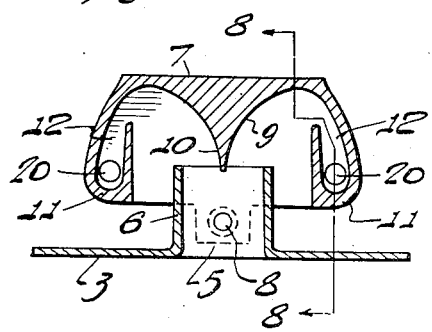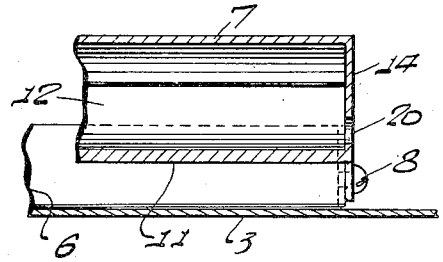

Patented July 11, 1933

1,918,005

UNITED STATES PATENT OFFICE

KENNETH M. URQUHART, OF NORFOLK, VIRGINIA

BUBBLE CAP

Application filed February 2, 1932. Serial No. 590,461.

This invention relates to improvements in fractionating columns or so called bubble towers employed in the fractional distillation of liquids, especially crude petroleum.

In practice gas is passed upwardly through the tower and in contact with descending liquid of lower boiling point and consequently where the gas velocity is comparatively high, entrained particles of liquid are liable to be carried through or out of the apparatus, which is objectionable.

In accordance with the present invention entrained liquid in the form of drops, froth and mist is effectively separated from the ascending gas or vapor, in successive zones or chambers, during the flow of the gas through the tower, and this separated liquid is trapped and returned to the chamber from which it was entrained. To effect this separation and trapping of entrained liquid particles the gas or vapor is split into thin streams and the direction of flow of the gas is abruptly changed in a curved passage of short radius thus causing the particles to be precipitated by centrifugal force and contact into a trap provided for this purpose. Furthermore the present invention provides a channel for the flow of gases from one chamber to the next, which channel offers a minimum of friction. This is very important in vacuum fractionating columns, as very high gas velocities can be employed with a minimum of friction and loss.

In the accompanying drawings wherein a preferred embodiment of my invention is illustrated:

Figure 1 is a vertical sectional view through a fractionating column embodying the invention;

Figure 2 is a section on the line 2—2 of Fig. 1;

Figure 3 is a section on the line 3—3 of Fig. 2;

Figure 4 is an enlarged sectional view through one of the bubble caps;

Figure 5 is a section on the line 5—5 of Fig. 4;

Figure 6 is a detail side view partly in section of one of the bubble caps;

Figure 7 is a cross sectional view through one of the bubble caps used on the top tray, which caps do not include a perforated strip, and Figure 8 is a fragmentary longitudinal sectional view through the bubble cap shown in Figure 7, the section being taken on line 8—8 of Figure 7.

Referring more particularly to the drawings, 1 denotes a preferably sheet metal bubble tower adapted to serve as a fractionating column, still, dephlegmator, chemical treating device and the like for contacting two or more fluids. This tower is subdivided into a series of compartments or chambers 2 by means of spaced fractionating plates or trays 3. In one application of the invention, gas or vapor is admitted to the bottommost chamber 2 through a pipe 4, which may be the vapor line from a still in which crude petroleum is vaporized, or it may lead to a source of natural gas. A liquid containing element to be absorbed by the vapor or gas or the liquid used as a cooling or absorbing agent depending upon the use of the column for stripping, fractionating or absorbing is admitted to the top compartment or chamber 2 through an inlet pipe 4' which leads from any suitable source of supply, not shown. Any suitable number of fractionating chambers 2 may be employed, three only being shown in the drawings, the top tray being a separator tray.

Each tray 3 is provided with a plurality of elongated gas passages formed in any desirable manner as by slitting the trays as at 5 and providing upstanding side and end walls 6 around the marginal edges of these slots. Bubble caps 7, suitably supported as at 8 extend down over and partially enclose the upwardly bent parallel portions or flanges 6, which constitute the side walls of slots 5. These caps are formed interiorly with two substantially semi-circular combined top and side wall portions 9, terminating at a common point in a depending wedge-shape beak portion or projection 10 which extends downwardly toward the plate flanges 6 and may extend downward into the slots 5. The lower outer longitudinal side edges of wall portions 9 have inwardly and thence upwardly bent pocket portions 11 forming pockets 12 through the full length of the caps at either side thereof. Where the caps are made of sheet metal the parts just described can be made in a forming machine, but if desirable the inwardly and upwardly extending pocket portions 11 may be separately formed and welded or otherwise suitably secured to the wall portions 9. Serrated strips 13, preferably welded to the pocket portions 11, terminate short of the top of plates or trays 3. The ends of the bubble caps are closed by end plates 14, and the end plate 14 adjacent the staggered down pipe draining the tray on which the cap is located, is provided with drain holes 20 for draining pockets 12.

Vapor admitted through inlet pipe 4 into the bottom chamber 2, above or below the liquid level line 15, depending upon the use of column, passes upwardly with entrained liquid through gas passages 5 and into contact with the beak portions 10, and is thus split into two thin streams, which are caused to flow upwardly and outwardly along the diverging curved lines of the inner wall portions 9 of the caps. This upward and slightly outward flow is abruptly changed to a downward and outward flow beneath serrated strips 13 into chamber 2 next above the one previously entered and thence upwardly through each successive chamber to the top or separating chamber. Here the gas passes through caps 7 into the top chamber and out of the column. There is no liquid on the top tray, and top bubble caps 7 are without serrated strip 13. Hence there is no bubbling or contact on this tray, only separation. The caps are drained at one end through holes 20 and the liquid goes onto a down pipe to the tray below. The liquid enters on this, the next to the top tray and goes across it and passes down through the down pipe to the next lowest tray and so on to the bottom of the column from whence it is drained by pipe Y.

Entrained liquid particles in the form of drops or mist are separated from the diverging streams of ascending vapor by centrifugal force and contacting surface when the direction of flow of the vapor is abruptly changed and the liquid particles are caused to impinge against the curved inner walls 9 of the bubble cap and drain down into the pockets 13, from whence the liquid is drained from the ends of the pockets 12 through holes 20 onto the tray and into the down pipes down to the tray or plate below. It will be understood that this principle of separation by splitting the gas flow into thin streams and abruptly changing the direction of vapor flow and utilizing the resulting centrifugal force and contacting surface to trap the entrained liquid particles can be carried out with caps other than those of the rectangular shape disclosed herein.

Having thus described my invention what I claim is:

1. Apparatus of the character described comprising a tower, slotted fractionating plates spaced from each other therein, said plates having upstanding portions at the sides of the slots forming a gas passage, a cap covering said passages and partially enclosing said upstanding portions, said cap having two interior substantially semi-circular top and side wall areas terminating in a wedge-shape intermediate beak portion, said beak portion extending downwardly toward said upstanding portions, and pockets formed in said cap for trapping liquid particles draining from said wall areas.

2. Apparatus of the character described comprising a tower, fractionating plates spaced from each other therein, a gas passage through said plates, a cap partially enclosing said passages, a pocket formed in said cap and an area on said cap leading to said pocket for changing the direction of gas flow and for draining into said pocket the liquid particles entrained by the gas passing through said passage and impinged upon said areas by the action of centrifugal force.

3. Apparatus of the character described comprising a tower, fractionating plates spaced from each other therein, an elongated gas passage through said plates, an elongated cap partially enclosing said gas passage, a depending centrally disposed elongated projection on said cap extending downwardly towards and substantially centrally of said passage, longitudinally disposed pockets formed in said cap at opposite sides of said passage for trapping liquid particles entrained by the gas flowing through said gas passage against said projection.

4. Apparatus of the character described comprising a tower, fractionating plates spaced from each other in said tower, said plates having a gas passage therethrough, a cap for said passage, means on said cap for deflecting the direction of flow of gas passing through said passage and splitting the gas flow into thin streams, curved portions on the interior of said cap for causing liquid particles impinged thereagainst to drain down the sides of said cap on opposite sides of said deflecting means, and means on said cap for trapping said liquid particles.

5. Apparatus of the character described comprising a tower, fractionating plates spaced from each other in said tower, said plates having a gas passage therethrough, a cap arranged directly opposite said passage, said cap having curved inner walls splitting the gas flow into thin streams and adapted to drain entrained liquid particles impinged thereagainst by the centrifugal action of gas flowing through said passage, and means on the lower edge of said wall for trapping said drained particles.

6. Apparatus of the character described comprising a tower, fractionating plates spaced from each other in said tower, said plates formed with a gas passage therethrough, a sheet metal cap positioned directly opposite said passage, the edges of said cap being bent upwardly to form pockets, and means on the interior of said cap adapted to drain entrained liquid particles into said pockets impinged against said means by the centrifugal action of gas flowing through said passage.

7. Apparatus of the character described comprising a tower, fractionating plates spaced from each other therein, a gas passage through said plates, a cap opposite and partially enclosing said passage, a pocket formed in said cap, the interior walls of said cap being formed to split the gas flow into thin streams and leading to and communicating with said pocket for collecting the liquid particles entrained by the gas passing through said passage and impinged upon said walls by the action of centrifugal force.

8. Apparatus of the character described comprising a tower, slotted fractionating plates spaced from each other therein and formed with gas passages therethrough, a cap covering said passages, said cap having two interior substantially semi-circular top and side wall areas terminating in a wedge-shape intermediate beak portion, said beak portion extending downwardly toward said passages and pockets formed in said cap for trapping liquid particles draining from said wall areas.

In testimony whereof I affix my signature.

KENNETH M. URQUHART.